United States Patent [19]
Nichols

[11] 3,849,753
[45] Nov. 19, 1974

[54] HEATER ATTACHMENT DEVICE FOR A WALL-MOUNTED THERMOSTAT

[75] Inventor: Robert A. Nichols, Xenia, Ohio

[73] Assignee: Capital Enterprises, Inc., Dayton, Ohio

[22] Filed: June 7, 1973

[21] Appl. No.: 367,862

[52] U.S. Cl. ............... 337/102, 337/107, 337/141, 337/377
[51] Int. Cl. .......................................... H01h 61/02
[58] Field of Search ........... 219/511, 526, 536, 527, 219/542; 337/100, 102, 107, 120, 141, 153, 182, 183, 184, 185, 324, 377

[56]            References Cited
          UNITED STATES PATENTS
2,498,983   2/1950   D'Albora ............................ 219/527
3,467,447   4/1949   Strezoff ............................. 219/527 X
3,553,624   1/1971   Dalzell et al. ..................... 337/102

Primary Examiner—J. D. Miller
Assistant Examiner—Fred E. Bell
Attorney, Agent, or Firm—Jacox & Meckstroth

[57]                    ABSTRACT

A low wattage electrical resistance heating element is supported within a tubular housing, and an elongated flexible support band is adjustably connected to the housing and extends over a wall-mounted thermostat for suspending the housing in vertically adjustable relation directly below the thermostat. An electrical power cord extends from the heating element through the housing to an electrical power supply, and energizing of the heating element produces a convection current of heated air upwardly through the housing. The heated air mixes with ambient air and flows into the thermostat to provide an air temperature higher than ambient air temperature so that the heating system is controlled in a manner to maintain an ambient air temperature lower than the setting of the thermostat.

11 Claims, 3 Drawing Figures

PATENTED NOV 19 1974 3,849,753
FIG-1
FIG-2
FIG-3
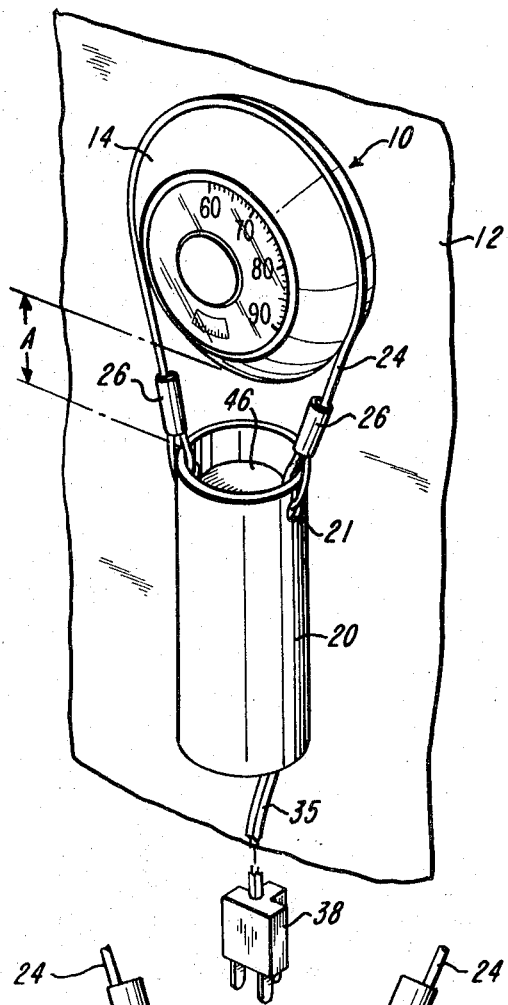
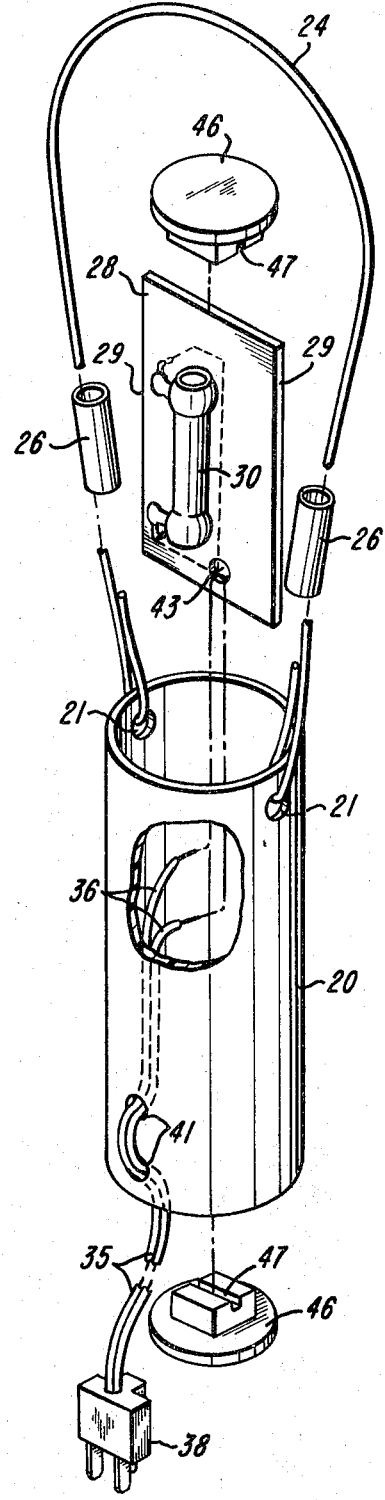
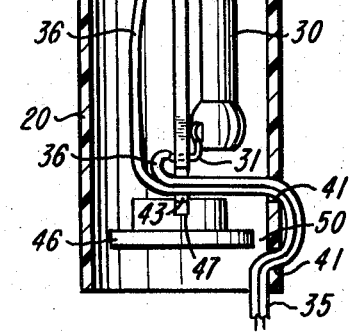

HEATER ATTACHMENT DEVICE FOR A WALL-MOUNTED THERMOSTAT

BACKGROUND OF THE INVENTION

In the control of a heating system for a residence, office or other building, it is common to install a thermostat on an inner wall which is located within an area where there is good air circulation. Usually, the thermostats provide for selecting a temperature within an effective control range of between 55° or 60° F. and 85° or 90° F. It is also common for many of the more recent thermostats to incorporate an internal heating element, referred to as a "heat anticipator," to provide advance heating of the bimetallic temperature sensing element and thereby prevent "overshooting" of the desired temperature level selected on the thermostat. Typical examples of thermostats incorporating heat anticipators, are disclosed in U.S. Pat. Nos. 3,015,447, 3,098,138, and 3,339,043.

It is frequently desirable to provide for maintaining the ambient air temperature in a house or other building at a level below the effective temperature control range of the thermostat. For example, when a newly constructed house or other building will remain unoccupied for a period of time during the winter, it is desirable to maintain the temperature of the air within the house or building slightly above freezing or between 35° F. and 40° F. to prevent the water pipes from freezing while minimizing the fuel consumed. Such a low ambient temperature is also desirable when an existing residence remains vacant or unoccupied for an extended period of time, for example, when a vacant house is being offered for sale, or the occupants have taken an extended winter vacation.

As a result of the precision construction required of a high quality wall-mounted thermostat, it has been found that when most of the thermostats are adjusted to the lower end of the effective temperature control range, the thermostat will continue to actuate the heating system in a manner which maintains the ambient air temperature substantially above 40° F., for example, between 50° and 60° F. Thus when the outside temperature drops below freezing, the heating system requires a significantly greater amount of fuel to maintain the ambient air temperature within the building between 50° F. and 60° F. than would be required to maintain the ambient air temperature between 35° and 40° F.

SUMMARY OF THE INVENTION

The present invention is directed to a heater attachment device which is particularly suited for temporarily controlling the operation of a thermostat so that the thermostat will actuate the heating system in a manner that maintains the ambient air temperature at a level providing for a significant reduction in the fuel consumed by the heating system. The heater attachment device of the invention is also simple and inexpensive in construction and is adapted for use in conjunction with practically all types of wall-mounted thermostats which are used for controlling the operation of various forms of heating systems. The heater device is also adapted for quick and convenient attachment to a wall-mounted thermostat and is precisely adjustable for selecting the desired ambient temperature.

In accordance with the illustrated embodiment of the invention, a heater attachment device includes a hollow cylindrical housing which enclosed a mounting plate or panel supporting an encapsulated electrical resistance heating element. An electrical power cord extends from the heating element through the housing to a 115 volt electrical power supply outlet. A set of cap members are secured to the upper and lower ends of the heating element support panel and cooperate with the inner surface of the housing to define corresponding annular air flow passages. The housing is supported or suspended by an elongated flexible cord or band which extends over the thermostat and is adjustably connected to the upper end of the housing.

Other features and advantages of the invention will be apparent from the following description, the accompanying drawing and the appended claims.

BRIEF DESCRIPTION OF THE DRAWING

FIG. 1 is a perspective view of a heater device constructed in accordance with the invention and illustrating its attachment onto a wall mounted thermostat;

FIG. 2 is an exploded perspective view of the heater attachment device shown in FIG. 1; and FIG. 3 is an elevational view of the heater attachment device with the housing shown in vertical section.

DESCRIPTION OF THE PREFERRED EMBODIMENT

An embodiment of a heater device constructed in accordance with the invention, is shown mounted on a thermostat 10 which is secured to a vertical wall surface 12. The thermostat 10 includes a rotatably adjustable temperature control dial 14 and is connected to control a heating system such as a gas or oil fired forced air furnace or hot water boiler. As illustrated in FIG. 1, the thermostat 10 provides for maintaining an ambient air temperature of between 60° F. and 90° F., which is a typical temperature range of a thermostat used to control the heating system for a single-family residence, apartment or office unit.

The heating attachment device shown in FIGS. 1-3, includes a cylindrical housing 20 which is preferably formed of a rigid plastics material such as a phenolic. A pair of diametrically opposed holes 21 are formed within the upper end portion of the housing 20 and receive corresponding end portions of an elongated flexible hanger member or cord 24. After each end portion of the cord 24 is extended through the corresponding hole 21, it is folded back on itself to form a loop which is secured by a slidable plastic tube or sleeve 26. Each of the looped end portions of the cord 24 may be positively secured to the housing 20 by heating the corresponding sleeve 26, for example, with a match, so that the sleeve shrinks and clamps the cord. Before heating both the sleeves 26, the vertical spacing between the thermostat 10 and the housing 20 may be adjusted by moving at least one of the sleeves up the cord 24 and then adjusting the corresponding looped end portion of the cord relative to the housing 20.

A rectangular support plate or panel 28 is positioned within the housing 10 and has opposite longitudinal edges 29 which are secured to the inner cylindrical surface of the housing 20 by a suitable cement or adhesive. The panel 28 is also formed of a plastics material such as phenolic, and is centered longitudinally within the tubular housing 20 as shown in FIG. 3. An encapsulated or potted electrical resistance heating element 30 is mounted on the panel 28 by a set of opposite wirelike end terminals 31 which extend through corresponding holes within the panel 28. The heating element 30 produces approximately 25 watts when connected to an electrical power supply of 115 volts.

An electrical power supply cord 35 includes two electrical conductors 36 which are connected to a plug 38 adapted to be inserted into a 115 volt electrical power supply outlet (not shown). The power supply cord 35 is looped through a set of axially spaced holes 41 within the housing 20 to form a strain resisting connection between the power cord 35 and the housing 20. The cord 35 also extends through a hole 43 formed within the lower portion of the panel 28, and the conductors 36 connect with the corresponding terminals 31 of the heating element 30.

A pair of circular cap members 46, also formed of a plastics material such as phenolic, are secured to the upper and lower end portions of the panel 28 by an adhesive which extends into corresponding diametrically extending slots 47 formed within the cap members 46 for receiving the end portions of the panel 28. The outer diameter of each of the cap members 46 is somewhat less than the inner diameter of the housing 20 for defining an annular air flow passage 50 between the outer cylindrical surface of each cap member 46 and the inner cylindrical surface of the housing 20.

The heater attachment device shown in the drawing, is used in the following manner. The flexible hanger member or cord 24 is looped over the thermostat 10, and one or both end portions of the cord 24 are adjusted so that the heater device is positioned directly below the thermostat and the spacing or distance A (FIG. 1) between the bottom surface of the thermostat and the upper surface of the housing 20 is approximately 1¼ inches. The power supply cord 35 is then connected with an electrical power supply outlet so that the heating element 30 generates approximately 25 watts of heat energy. As the air within the housing 20 is heated by the heating element 30, an upward convection current of air is produced through the upper and lower annular passages 50 so that the housing 20 provides a chimney effect.

The heated air rising from the housing 20 mixes with the ambient air adjacent the top of a housing 20 and flows into the thermostat 10 so that the thermostat senses air which is warmer than the ambient air. For example, in one test unit which provided highly satisfactory results, the heating element 30 increased the temperature of the air within the thermostat about 25° F. Thus when the thermostat 10 was set at its lowest effective control temperature of 60° F., the heating system was controlled by the thermostat to maintain the ambient air at approximately 35° F.

If it is desired to lower the temperature of the ambient air, one end of the cord 24 is adjusted so that the effective length of the cord 24 is shortened, and the housing 20 and the heating element 30 are positioned closer to the thermostat 10. If it is desired to increase the temperature of the ambient air closer to the minimum operating temperature of the thermostat 10, for example, 50° F., the housing 20 and the heating element 30 are lowered relative to the thermostat 10 by increasing the effective length of the cord 24.

From the drawing and the above description, it is apparent that a heater attachment device constructed in accordance with the present invention, provides desirable features and advantages. For example, this heater device is convenient to use since it only requires placing the band or cord 24 over the wall mounted thermostat 10 and inserting the plug 38 into a convenient electrical outlet. In addition, the device is adapted for convenient adjustment relative to the thermostat to provide for precisely selecting the temperature of the ambient air. Furthermore, the heater device is simple and inexpensive in construction and is adapted to be used in conjunction with many existing types of wall-mounted thermostats.

While the form of heater device herein described constitutes a preferred embodiment of the invention, it is to be understood that the invention is not limited to this precise form of device, and that changes may be made therein without departing from the scope and spirit of the invention as defined in the appended claims.

The invention having thus been described, the following is claimed:

1. A heating device adapted for temporary use with a wall-mounted thermostat connected to control a heating system to provide for a controlled reduction in the operation of the heating system below the effective operating control range of the thermostat, said device comprising an electrical heating element, a housing having an upper end portion and a lower end portion and defining an air flow passage extending between said end portions, means on said housing for supporting said heating element adjacent said passage to provide for a flow of air generally upwardly within said passage in response to heating of the air within said passage by said heating element, an electrical power supply cord connected to said heating element and extending from said housing for connection within an electrical power supply, and means for temporarily supporting said housing below the thermostat in a position where said passage directs the heated air upwardly into the thermostat.

2. A heating device as defined in claim 1 wherein said means for temporarily supporting said housing includes means for adjusting the vertical position of said housing and said heating element relative to the thermostat to provide for precisely selecting the reduction in the operation of the heating system.

3. A heating device as defined in claim 1 wherein said means for temporarily supporting said housing, comprises a support member adapted to be attached to the thermostat and arranged to support said housing in suspended relation below the thermostat.

4. A heating device as defined in claim 3 wherein said support member comprises an elongated flexible band member adapted to extend over the thermostat and having at least one end portion connected to said housing.

5. A heating element as defined in claim 4 including means for adjustably connecting said end portion of said hanger member to said housing to provide for adjusting the vertical spaced relation between said housing and the thermostat.

6. A heating device as defined in claim 1 wherein said housing is tubular and is adapted to be supported with a generally vertical axis.

7. A heating device as defined in claim 6 including a generally flat panel positioned within said housing and supporting said heating element, and means secured to the upper and lower portions of said panel and cooperating with said tubular housing to define annular openings for said passage.

8. A heating device as defined in claim 1 wherein said housing defines a set of spaced holes, and said power supply cord extends through said holes to provide a strain resisting connection of said cord to the said housing.

9. A heating device as defined in claim 1 wherein said means for supporting said housing, comprises an adjustable member adapted to be attached to the thermostat and connected to said housing.

10. A heating device as defined in claim 1 wherein said housing comprises a cylindrical tube, said means supporting said housing including a flexible hanger member having opposite end portions connected to the upper end portion of said tube and adapted to extend over the thermostat, a panel positioned within said tube and supporting said heating element, and means projecting from the upper and lower portions of said panel and cooperating with said housing to define annular air flow passages within the upper and lower end portions of said tube.

11. In combination with wall-mounted thermostat connected to control a heating system, a heating device for providing a controlled reduction in the operation of the heating system below the effective operating control range of said thermostat, said device comprising an electrical heating element, means for temporarily supporting said heating element in spaced relation below said thermostat and for directing a flow of air heated by said element upwardly into said thermostat, an electrical power supply cord connected to said heating element, and means for adjusting the flow of heated air into said thermostat.

* * * * *